(12) United States Patent
Subramanian et al.

(10) Patent No.: US 11,086,820 B2
(45) Date of Patent: *Aug. 10, 2021

(54) METHOD AND APPARATUS FOR MANAGING STORAGE SPACE ON STORAGE DEVICE IN AN ELECTRONIC APPARATUS BY USING CONTEXT DATA AND USER PROFILE DATA

(71) Applicant: SAMSUNG ELECTRONICS CO., LTD., Gyeonggi-do (KR)

(72) Inventors: Muthukumar Subramanian, TamilNadu (IN); Revoti Prasad Bora, Guwahati (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 150 days.

This patent is subject to a terminal disclaimer.

(21) Appl. No.: 15/686,467

(22) Filed: Aug. 25, 2017

(65) Prior Publication Data

US 2018/0004770 A1 Jan. 4, 2018

Related U.S. Application Data

(63) Continuation of application No. 14/077,629, filed on Nov. 12, 2013, now Pat. No. 9,747,296.

(30) Foreign Application Priority Data

Nov. 12, 2012 (IN) .......................... 4719/CHE/2012
Jul. 22, 2013 (KR) ........................ 10-2013-0086267

(51) Int. Cl.
*G06F 16/17* (2019.01)
*G06F 16/16* (2019.01)

(52) U.S. Cl.
CPC ........ *G06F 16/1727* (2019.01); *G06F 16/162* (2019.01)

(58) Field of Classification Search
CPC .......................... G06F 16/1727; G06F 3/0608
See application file for complete search history.

(56) References Cited

U.S. PATENT DOCUMENTS 5,999,978 A 12/1999 Angal et al.
6,253,214 B1 6/2001 Hall et al.
(Continued)

FOREIGN PATENT DOCUMENTS

KR 10-2002-0082719 A 10/2002
KR 1020070013782 A 1/2007
(Continued)

OTHER PUBLICATIONS

Margus Saluste, "Free Up Disk Space in Windows", http://www.winhelp.us/free-up-disk-space-in-windows.html, Oct. 10, 2013, 20 pgs total.

(Continued)

*Primary Examiner* — William Spieler
(74) *Attorney, Agent, or Firm* — Sughrue Mion, PLLC (57) ABSTRACT

A method and apparatus for reserving a usable storage space on a storage device is provided. The method includes collecting context data representing an environment surrounding the storage device; selecting at least one file from among files stored in the storage device by using at least one of the context data and user profile data; and processing the selected file and reserving a usable storage space on the storage device. The method reserves the usable storage space by using the context data or user profile data, thereby allowing efficient reserving of usable storage space without a user's manual intervention and preventing waste of unnecessary resources.

13 Claims, 7 Drawing Sheets

(56) References Cited

U.S. PATENT DOCUMENTS

| | | |
|---|---|---|
| 6,564,282 B1 | 5/2003 | Torres |
| 7,136,882 B2* | 11/2006 | Collins .................. G06F 3/0601 |
| 7,266,132 B1 | 9/2007 | Liu et al. |
| 9,311,192 B2 | 4/2016 | Denny et al. |
| 2003/0065873 A1 | 4/2003 | Collins et al. |
| 2003/0217057 A1 | 11/2003 | Kuroiwa et al. |
| 2004/0015662 A1* | 1/2004 | Cummings ........... G06F 3/0608 |
| | | 711/154 |
| 2004/0143626 A1 | 7/2004 | Kemp et al. |
| 2004/0199740 A1 | 10/2004 | Makela et al. |
| 2004/0251887 A1 | 12/2004 | Sparrell et al. |
| 2004/0260973 A1 | 12/2004 | Michelman |
| 2005/0240756 A1* | 10/2005 | Mayer .................... G06F 9/4418 |
| | | 713/2 |
| 2006/0294198 A1* | 12/2006 | Muralidhar ......... G06F 11/1464 |
| | | 709/217 |
| 2007/0106714 A1* | 5/2007 | Rothbarth ........... G06F 11/1461 |
| 2008/0162523 A1 | 7/2008 | Kraus et al. |
| 2008/0209264 A1* | 8/2008 | Morse ................. G06F 11/0778 |
| | | 714/6.32 |
| 2009/0228531 A1* | 9/2009 | Baumann ................ G06F 16/11 |
| 2010/0088317 A1* | 4/2010 | Bone ................... G06F 16/1734 |
| | | 707/737 |
| 2010/0106685 A1* | 4/2010 | Ott ....................... G06F 16/1787 |
| | | 707/611 |
| 2010/0274765 A1 | 10/2010 | Murphy et al. |
| 2012/0047154 A1* | 2/2012 | Lin ....................... G06F 3/0608 |
| | | 707/756 |
| 2012/0124109 A1* | 5/2012 | Vecera .................... G06F 16/21 |
| | | 707/823 |
| 2012/0185431 A1 | 7/2012 | Denny et al. |
| 2013/0159654 A1* | 6/2013 | Sakai .................... G06F 3/0605 |
| | | 711/163 |
| 2014/0289189 A1* | 9/2014 | Chan .................... G06F 11/1464 |
| | | 707/610 |
| 2015/0186538 A1* | 7/2015 | Yan ..................... G06F 16/2246 |
| | | 707/722 |

FOREIGN PATENT DOCUMENTS

| | | |
|---|---|---|
| KR | 1020090024575 A | 3/2009 |
| KR | 10-2009-0072382 A | 7/2009 |

OTHER PUBLICATIONS

Oracle, Database Application Developer's Guide—Fundamentals, Developing Applications with Database Change Notification, Nov. 18, 2011, accessed Aug. 17, 2015 at http://web.archive.org/web/20111118013904/http://docs.oracle.com/cd/B19306_01/appdev.102/b14251/adfns_dcn.htm.

Teradata, Adding Compression to existing table, forum post on Aug. 17, 2009, accessed Aug. 17, 2015 at https://forums.teradata.com/forum/database/adding-compression-to-existing-table.

Communication dated Mar. 26, 2019, issued by the Indian Intellectual Property Office in corresponding Application No. 4719/CHE/2012.

Communication dated Aug. 19, 2019, issued by the Korean Intellectual Property Office in counterpart Korean Application No. 10-2013-0086267.

Communication dated Nov. 16, 2020 issued by the Korean Patent Office in application No. 10-2020-0059325.

Communication dated Mar. 29, 2021, issued by the Korean Intellectual Property Office in Korean Application No. 10-2021-0020691.

The YouTube Tech Guy, How to Automatically Backup Your Photos on Adnroid at https://youtu.be/PUFggsle32c (upload date: May 21, 2012).

* cited by examiner

FIG. 5

| TASK PERFORMED | LAST FILE ACCESS DATE |
|---|---|
| FOLLOWING TASK HAS BEEN PERFORMED TO RESERVE SUFFICIENT SPACE. | |
| DELETE movie.avi | 2000 − 01 − 01 |

FIG. 6

| TASKS PERFORMED | LAST FILE ACCESS DATE |
|---|---|
| MOVE movie.avi | 2000 − 01 − 01 |
| COMPRESS GAME FOLDER | 2000 − 01 − 02 |

FIG. 7

DO YOU WANT TO DELETE movie.avi FILE TO RESERVE SUFFICIENT SPACE?
(650 MB FREE SPACE)

YES  NO

| USER ID | USAGE TIME | USER PREFERENCE | USER INCLINATION | FILE NAME | PRIORITY LEVEL | UNUSED DATA | DATA AUTOMATIC DELETION |
|---|---|---|---|---|---|---|---|
| ID1 | 2:00 to 8:00 | WATCHING MOVIES | DELETE FILE IN C:\DOWNLOAD IN LESS THAN A WEEK | movie.avi | 1 | USED | PERMITTED |
| ID1 | 2:00 to 8:00 | WATCHING MOVIES | | GAME.FOLDER | 2 | USED | FORBIDDEN |
| ID1 | 2:00 to 8:00 | WATCHING MOVIES | | zip.zip | 3 | UNUSED | PERMITTED |

METHOD AND APPARATUS FOR MANAGING STORAGE SPACE ON STORAGE DEVICE IN AN ELECTRONIC APPARATUS BY USING CONTEXT DATA AND USER PROFILE DATA

RELATED APPLICATIONS

This application is a continuation application of U.S. patent application Ser. No. 14/077,629, filed Nov. 12, 2013, which claims priority from India Application No. 4719/CHE/2012, filed on Nov. 12, 2012, in the India Patent Office and Korean Patent Application No. 10-2013-0086267, filed on Jul. 22, 2013, in the Korean Intellectual Property Office, the disclosures of which are incorporated herein by reference, in their entireties.

BACKGROUND

1. Field

One or more exemplary embodiments relate to a method and apparatus for managing a storage space on a storage device in an electronic apparatus which includes the storage device. More particularly, the exemplary embodiments to a technique for reserving a usable storage space on a storage device.

2. Description of the Related Art

To prevent unnecessary waste of resources, it is important to maintain a usable storage space on a storage device to which data is being copied from another storage device, prior to the data being copied.

For example, if a user downloads data to an electronic apparatus from the Internet, the downloaded data is first stored in a cache memory and then transmitted to a storage device in the electronic apparatus. When the storage device has an insufficient space available therein to store the data, the result may be a waste of a lot of resources, including Internet resources for downloading the data, cache memory resources for storing the data, and central processing unit (CPU) resources for copying the data.

Thus, in order to copy data without wasting resources, a sufficient space should be freed up on a storage device by deleting, compressing, or moving unnecessary files prior to or while copying data. A technique of the related art requires the manual intervention of a user to free up a sufficient space by deleting, compressing or moving unnecessary files.

SUMMARY

One or more exemplary embodiments include a method and apparatus for efficiently reserving sufficient space required to copy data by deleting, compressing or moving unnecessary files without user intervention. In particular, a method and apparatus for efficiently freeing up usable storage space, based on the environment surrounding the storage device and user characteristics.

Additional aspects will be set forth in part in the description which follows and, in part, will be apparent from the description, or may be learned by practice of the exemplary embodiments.

According to one or more exemplary embodiments, a method of managing a storage space on a storage device in an electronic apparatus including the storage device includes: collecting context data which represents an environment surrounding the storage device; selecting at least one file from among files stored in the storage device by using at least one of the context data and user profile data; and processing the selected file and reserving a usable storage space on the storage device.

In reserving usable storage space on the storage device, at least one of deletion, movement and compression may be performed on the selected file.

The context data may include at least one of sensor information, time information, location information, network information and information related to the storage device.

The user profile data may include at least one of user inclination, user preference, user ID information, the usage time of the storage device, the number of times that a user accesses data, information related to data unused by the user, information related to the time when data is last accessed by the user, information related to a priority level of data and information related to a user's automatic deletion of data.

In reserving the usable storage space on the storage device, in response to a determination that that the storage device is able to connect to a wireless network while the user moves, the selected file may be moved over the wireless network to another storage device.

In reserving usable storage space on the storage device, in response to a determination that the storage device is not connected to the wireless network while the user moves, the selected file is moved to another storage device within the electronic apparatus.

The method may further include receiving the user profile data from a user of the storage device.

In reserving usable storage space on the storage device, at least one of the context data and the user profile data may be used.

The method further includes outputting a message which indicates that the usable storage space has been reserved to a user on the storage device.

The method may further include outputting a message which indicates to a user the performance of at least one of the performed tasks.

The method may further include outputting a message which confirms whether to delete the selected file to a user when the selected file is to be deleted.

According to one or more exemplary embodiments, an apparatus for managing a storage space on a storage device includes: a context data collector configured to collect context data which represents an environment surrounding the storage device; a file selector configured to select at least one from files stored in the storage device by using at least one of the context data and user profile data; and a file processor configured to process the selected file and reserves a usable storage space on the storage device.

The file processor may perform at least one of deletion, movement and compression of the selected file.

The context data may include at least one of sensor information, time information, location information, network information, and information related to the storage device.

The user profile data may include at least one of user inclination, user preference, user ID information, the usage time of the storage device, the number of times that a user accesses data, information related to data unused by the user, information related to the time when data is last accessed by the user, information related to a priority level of data and information related to a user's automatic deletion of data.

In response to a determination that the storage device is able to connect to a wireless network while the user moves, the file processor may move the selected file over the wireless network to another storage device.

In response to a determination that the storage device is not connected to the wireless network while the user moves, the file processor may move the selected file to another storage device within an electronic apparatus which includes the storage device.

The apparatus may further include a user input configured to receive the user profile data from a user of the storage device.

The file processor may be configured to use at least one of the context data and the user profile data.

The apparatus may further include a message output configured to output a message which indicates that the usable storage space has been reserved to a user on the storage device.

The apparatus may further include a message output configured to output a message which indicates to a user the performance of at least one of the performed tasks.

The apparatus may further include a message output configured to output a message confirming whether to delete the selected file to a user when the selected file is to be deleted.

An aspect of an exemplary embodiment may further provide an apparatus for managing a storage space on a storage device of an electronic apparatus which includes the storage device, the apparatus including: a context data collector, configured to collect context data; a file selector configured to select at least one file from among files stored in the storage device by using at least one of the collected context data and user profile data; and a file processor configured to process the selected at least one file and reserve a usable storage space on the storage device based on the collected context data and the user profile data, without manual input from a user.

The collected context data may represent an environment surrounding the storage device. The file processor may moves the selected file to another storage device over the wireless network, in response to a determination that the storage device is able to connect to a wireless network while the user moves.

The file processor moves the selected file to another storage device within an electronic apparatus which includes the another storage device, in response to a determination that the storage device is not connected to the wireless network while the user moves.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF THE EXEMPLARY EMBODIMENTS

The exemplary embodiments will now be described more fully hereinafter with reference to the accompanying drawings so that they may be easily implemented by one of ordinary skill in the art. The exemplary embodiments may, however, be embodied in many different forms and should not be construed as being limited to the exemplary embodiments set forth herein. Parts not related to the exemplary embodiments are omitted to clarify the description of the exemplary embodiments. Like numerals denote like elements throughout. Expressions such as "at least one of," when preceding a list of elements, modify the entire list of elements and do not modify the individual elements of the list.

As used herein, the expression "context data" refers to data that is used as a basis for determining an environment surrounding a storage device, such as sensor information, time information, location information, network information and information related to the storage device. According to one or more exemplary embodiments, the storage device selects a file having a low priority from the storage device, and determines which tasks to perform in order to process the selected file in order to reserve a storage space on the storage device based on context data.

"User profile data" refers to information related to a user, such as user inclination, user preference, user ID information, the usage time of a storage device, the number of times that a user accesses data, information related to data unused by the user, information related to the time when data is last accessed by the user, information related to a priority level of data and information related to a user's automatic deletion of data. For example, the user profile data may include information containing a user's history and characteristics, and information used to identify the user. The user profile data may be stored based on the user's history. According to one or more exemplary embodiments, the storage device selects a file having a low priority from the storage device, and determines which tasks to perform in order to process the selected file in order to reserve a storage space on the storage device based on the context data.

Exemplary embodiments will now be described in detail with reference to the accompanying drawings.

Figure 1:
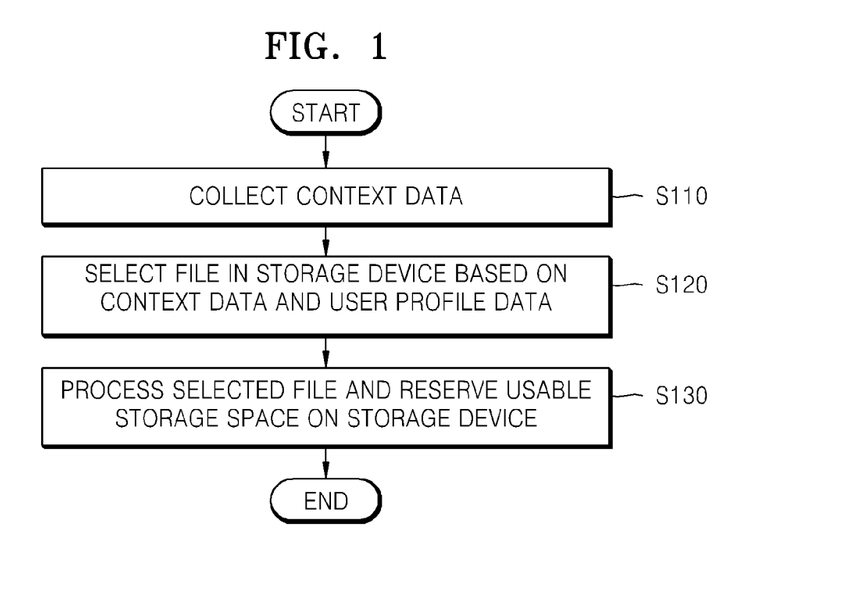
FIG. 1 is a flowchart of a method of managing a storage space on a storage device in an electronic apparatus which includes the storage device, according to an exemplary embodiment.

FIG. 1 is a flowchart of a method of managing a storage space on a storage device in an electronic apparatus which includes the storage device, according to an exemplary embodiment. Examples of the electronic apparatus may include laptops, notebook computers, mobile phones, personal digital assistants (PDAs) and other communication devices. The storage device may include volatile and non-volatile storage media.

The volatile storage media may include a dynamic memory such as Random Access Memory (RAM). The non-volatile storage media may include a static memory such as RAM, a floppy disk, an optical disk, and a hard disk.

Context data representing an ambient environment of a storage device is collected (S110). The context data may be collected through a sensor. For example, location information that is an example of context data may be collected by a Global Positioning System (GPS) sensor. Time information that is another example of context data may be received from a server. Information related to a storage device that is another example of context data may contain the remaining storage space and the performance of a surrounding storage device. Network information may contain a network that may be used by a user and its performance.

At least one file is selected from files stored in the storage device based on user profile data and context data (S120). An environment surrounding the storage device may be identified on the basis of the collected context data. That is, the collected context data may provide a basis for determining a selection of a file having a low priority. The user profile data represents the characteristics of a user and is used as a reference in determining a file having a low priority.

The selected file is processed to reserve a usable storage space on the storage device (S130). A task that will be performed to reserve the storage space on the storage device is determined by using at least one of context data and user profile data. At least one of deletion, movement and compression of the selected file may be performed to reserve the storage space. In response to the determination that the storage device is able to connect to a wireless network while the user moves, the electronic apparatus may move the selected file to another storage device over the wireless network. On the other hand, in response to the determination that the storage device is not connected to the wireless network while the user moves, the electronic apparatus may move the selected file to another storage device in the electronic apparatus. When the usable storage space is reserved on the storage device, a message indicating that the usable storage space has been reserved on the storage device may be output to the user. In particular, a message which indicates the performance of at least one of the performed tasks may be output to the user. In response to the determination that the selected file is to be deleted, a message confirming whether the user wishes to delete the file may be output to the user.

The electronic apparatus may receive user profile data from the user of the storage device.

Figure 2:
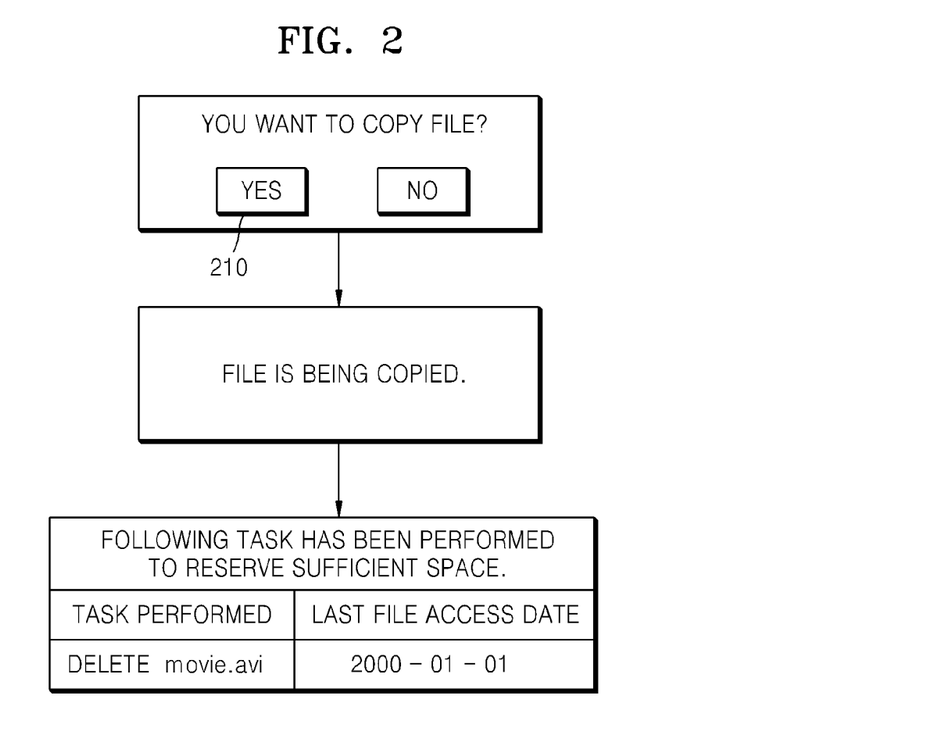
FIG. 2 illustrates reservation of a usable storage space on a storage device based on user profile data, according to an exemplary embodiment.

FIG. 2 illustrates reservation of a usable storage space on a storage device based on user profile data, according to an exemplary embodiment.

In the exemplary embodiment, an assumption is made that the storage device has an insufficient space to store a file that a user makes a request to copy.

An assumption is also made that the user watched a movie by playing a movie file movie.avi a long time ago (2000-01-01), and that the movie file movie.avi has since been stored on the storage device without being played. Information which indicates that the user has stored the movie file movie.avi without watching the same for a long time may be stored as part of the user profile data.

Referring to FIG. 2, the user selects YES 210 to request copying of a file to the storage device. When the user makes a request to copy the file to the storage device, the file is copied to the storage device, and a message which indicates that the file is being copied is displayed to the user on a screen. While the file is being copied to the storage device, the user may select the movie file movie.avi that has not been played for a long time. The selected movie file movie.avi may be deleted, moved or compressed so as to reserve a usable space on the storage device. According to an exemplary embodiment, a usable space is reserved by deleting the movie file movie.avi. In this case, a message indicating that the movie file movie.avi has been deleted may be displayed to the user.

Figure 3:
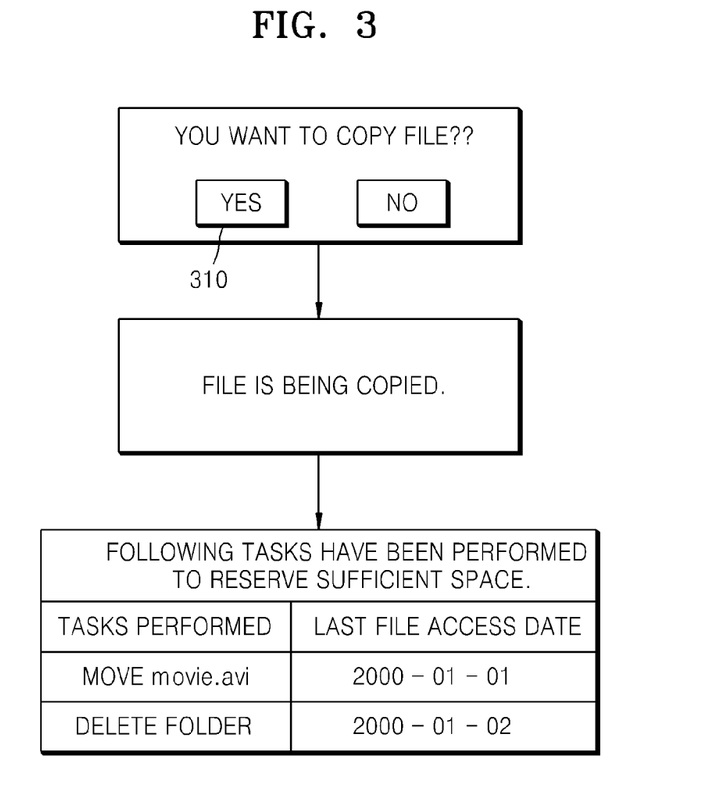
FIG. 3 illustrates reservation of a usable storage space on a storage device based on user profile data, according to another exemplary embodiment.

FIG. 3 illustrates reservation of a usable storage space on a storage device based on user profile data, according to another exemplary embodiment.

In an exemplary embodiment, an assumption is made that the storage device has insufficient space to store a file that a user has requested to copy.

An assumption is also made that the user has a preference for movies. The user preference may be received through a user interface and stored as part of a user profile data. The user preference may be determined based on a user's history, and the determined user preference may be stored as part of the user profile data.

Referring to FIG. 3, the user selects YES 30 to request copying of a file to the storage device. When the user makes a request to copy the file to the storage device, the file is copied to the storage device, and a message indicating that the file is being copied is displayed to the user on a screen. While the file is being copied to the storage device, the user may select a file having a low priority to reserve a usable space on the storage device. A movie file may not be selected based on a part of the user profile data which represents the user preference for movies, so as to reserve a usable storage space on the storage device. However, the exemplary embodiments are not limited thereto, and a movie file may be selected, notwithstanding the portion of the user profile data which represents the user preference for movies. When a usable space is reserved on the storage device based on the portion of usable profile data which indicates the user preference for movies, the selected movie file may not be deleted. The usable space may be reserved on the storage device by moving or compressing the movie file, instead of deleting the same. In an exemplary embodiment, the usable space has been reserved on the storage device by moving the selected movie file movie.avi and by deleting a folder which is unrelated to a movie. As shown in FIG. 3, tasks performed to reserve the usable space on the storage device may be displayed to the user.

Figure 4:
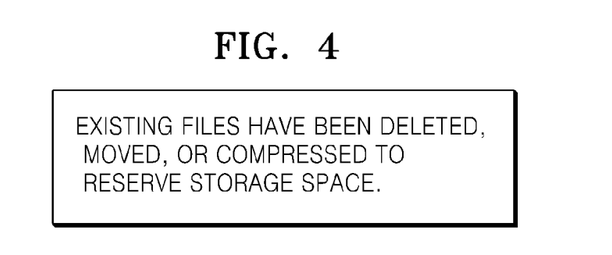
FIG. 4 illustrates a screen that displays tasks performed in order to free up to a user a storage space on a storage device, according to an exemplary embodiment.

FIG. 4 illustrates a screen that displays tasks performed to reserve a storage space on a storage device to a user, according to an exemplary embodiment.

Referring to FIG. 4, the screen informs the user that a file stored in the storage device is deleted, moved or compressed in order to reserve a usable storage space on the storage device without requiring user intervention, to avoid having the user misunderstand the performed tasks.

Figure 5:
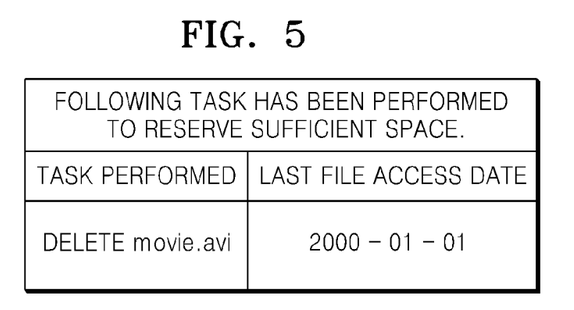
FIG. 5 illustrates a screen that displays details related to tasks performed to free up a storage space to a user on a storage device, according to an exemplary embodiment.

FIG. 5 illustrates a screen that displays details related to tasks performed to reserve a storage space on a storage device to a user, according to an exemplary embodiment. Unlike the screen illustrated in FIG. 4, according to an exemplary embodiment, the screen informs the user of details related to the tasks performed in order to reserve the storage space on the storage device.

Figure 6:
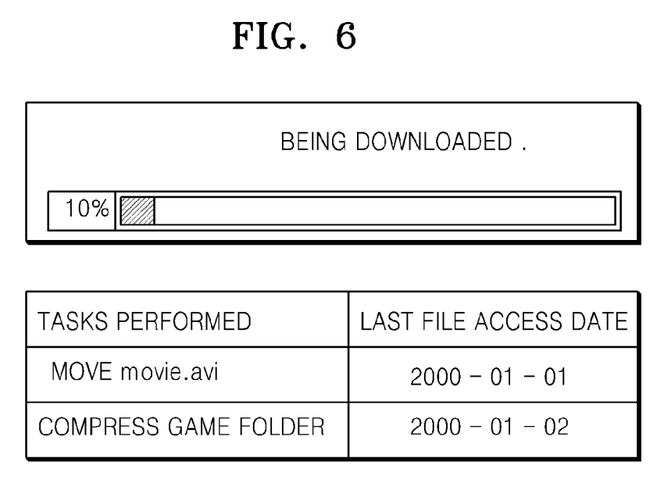
FIG. 6 illustrates reservation of a usable storage space on a storage device based on context data in an electronic apparatus which includes the storage device, according to an exemplary embodiment.

FIG. 6 illustrates reservation of a usable storage space on a storage device based on context data in an electronic apparatus which includes the storage device, according to an exemplary embodiment.

In an exemplary embodiment, an assumption is made that a user is downloading a file over the Internet early in the morning. In most cases where a file is downloaded to the storage device early in the morning, the user may be nowhere near the storage device. Thus, when the electronic apparatus deletes a user's files stored in the storage device without permission during a user's absence, the result may be that the user may lose important files.

According to an exemplary embodiment, current time information may be collected as a portion of the context data, and a usable storage space may be reserved on the storage device based on the current time information. The current time information may be used to determine the time when data is downloaded to the storage space on the storage device. When the time information indicates that data is downloaded at dawn, the usable storage space may be reserved by moving or compressing a file, instead of deleting it.

A light sensor may be used to detect that there is no light around the storage device, or a short-range sensor may detect that the user is not nearby the storage device.

Referring to FIG. 6, when data is downloaded to the storage device on the storage device early in the morning, a file may not be deleted from the storage device. Instead of deleting the file, a movie.avi file in the storage device may be moved to another storage device, or a game folder therein may be compressed.

Figure 7:
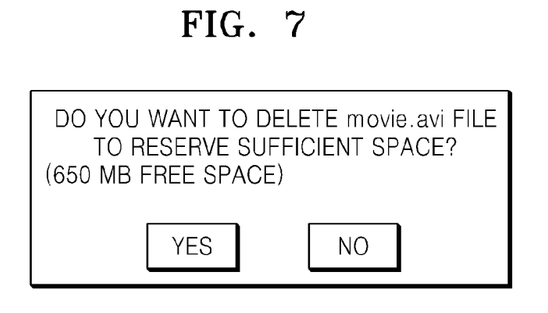
FIG. 7 illustrates a screen that outputs a message to a user prior to freeing up a storage space on a storage device, according to an exemplary embodiment.

FIG. 7 illustrates a screen that outputs a message to a user prior to freeing up a storage space on a storage device, according to an exemplary embodiment.

The user may not want a predetermined task to be performed from among tasks for reserving a usable storage space. Thus, as shown in FIG. 7, the screen may display a message that informs a user of a task that will be performed prior to reserving a usable storage space on a storage device. The user may then select whether a task will be performed for reserving a storage space. It is also possible to predict the size of a space on the storage device that will be created by performing the task for reserving the usable storage space thereon. The screen also displays the predicted size so as to inform the user.

Figure 8:
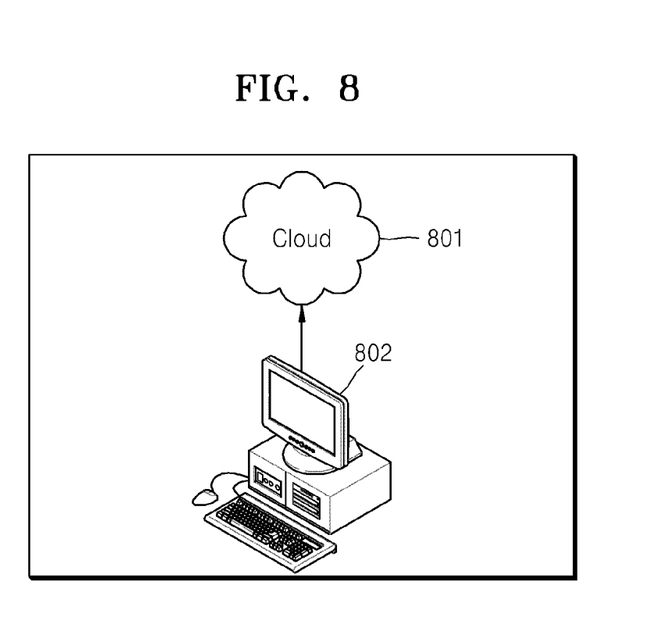
FIG. 8 illustrates movement of unnecessary files within a storage device through a network, according to an exemplary embodiment.

FIG. 8 illustrates movement of unnecessary files stored in a storage device through a network, according to an exemplary embodiment. Examples of the network may include a local area network (LAN), a wide area network (WAN), a wireless network and a cloud network.

FIG. 8 shows a cloud space 801 and an electronic apparatus 802.

Unnecessary files selected in a storage device incorporated in the electronic apparatus 802 may be moved to another remote electronic apparatus over the network in order to reserve a storage space. Referring to FIG. 8, in an exemplary embodiment, an assumption is made that an unnecessary file is moved over the network and stored in the cloud space 801. An authentication process may be performed to access the cloud space 801 prior to moving the file to the cloud space 801. Since an identifier or password needed for the authentication process may be stored in advance as part of the user profile data, the authentication process may be performed without the user's intervention. However, the exemplary embodiments not limited thereto, and direct user authentication may be required. After completing the authentication process, the file in the storage device may be moved to the cloud space 801 over the network.

Figure 9:
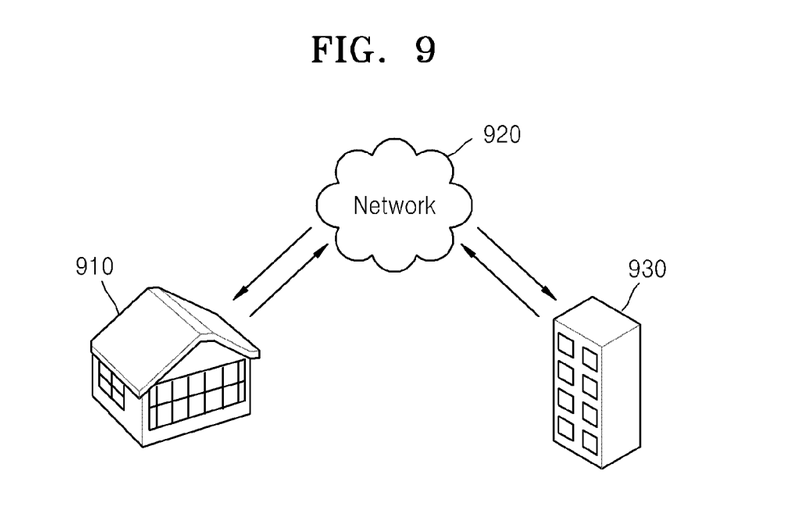
FIG. 9 illustrates transfer of unnecessary files between a plurality of electronic apparatuses used by a user over a network based on context data, according to an exemplary embodiment.

FIG. 9 illustrates a transfer of unnecessary files between a plurality of electronic apparatuses used by a user over a network, based on context data, according to an exemplary embodiment.

FIG. 9 shows a home 910, a network 920, and a company 930.

A user may use the plurality of electronic apparatuses in a plurality of places. Files may be arranged according to user preferences in each place. In an exemplary embodiment, an assumption is made that the user operates electronic apparatuses in the home 910 and the company 930.

When using an electronic apparatus including a storage device in the company 930, the user may want video files, such as a movie file, to be moved to another storage device, since the video files occupy a large percentage of the storage space on the storage device of the electronic apparatus. For example, the video files may be moved over network 920, to a storage device of another electronic apparatus used in the home 910.

When using an electronic apparatus including a storage device in the home 910, the user wants document files, such as a file related to work at the company 930, to be moved to another storage device. Thus, the document files may be moved over the network 920 to the other storage device of the electronic apparatus used in the company 930. Thus, the user may gather the documents without scattering them within different locations.

When a file that the user desires to be moved and a location of a desired storage space are preset, the desired file may be preferentially moved to the desired location, in order to reserve a usable storage space on the storage device.

Figure 10:
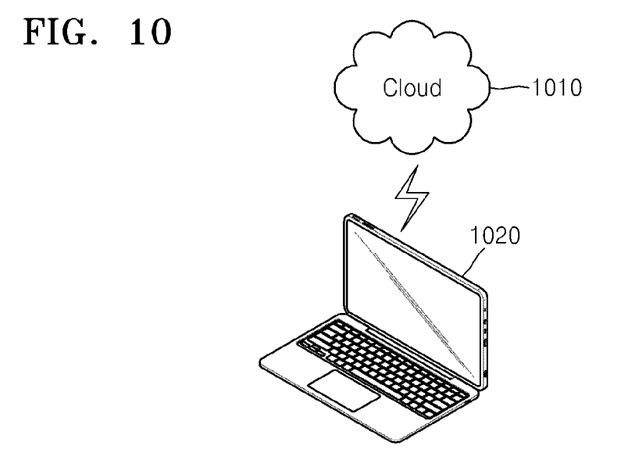
FIG. 10 illustrates reservation of a usable storage space on a storage device in a mobile apparatus which includes the storage device based on network information, according to an exemplary embodiment.

FIG. 10 illustrates reservation of a usable storage space on a storage device in a mobile apparatus including the storage device based on network information, according to an exemplary embodiment. FIG. 10 shows a mobile apparatus 1020 and a cloud space 1010.

When the storage device is included in the mobile apparatus 1020, such as a portable notebook or a smartphone, movement of a file having a low priority over a network may be determined according to whether the mobile apparatus 1020 is connectable to the network. The mobile apparatus 1020 may use a wireless network. For example, in response to the mobile apparatus 1020 being located in an environment, such as a home, where the mobile apparatus 1020 may easily connect to a network, the mobile apparatus 1020 may move a file over the network. According to an exemplary embodiment, a file is moved to the cloud space 1010 over the network. However, the exemplary embodiments are not limited thereto, and the file may be moved over the network to another remote electronic apparatus. Although the user desires to have a sufficient usable storage space on the storage device of the mobile apparatus 1020, the number of unnecessary large files may increase due to due to their being limited storage space. In this case, another desired file may not be copied. To solve this problem, with the advancement in network technology, a file may be moved through the network to another electronic apparatus or the cloud space 1010. When the mobile apparatus 1020 is moved by the user, network information in the context data may be used to determine whether the mobile apparatus 1020 smoothly connects to a wireless network.

Figure 11:
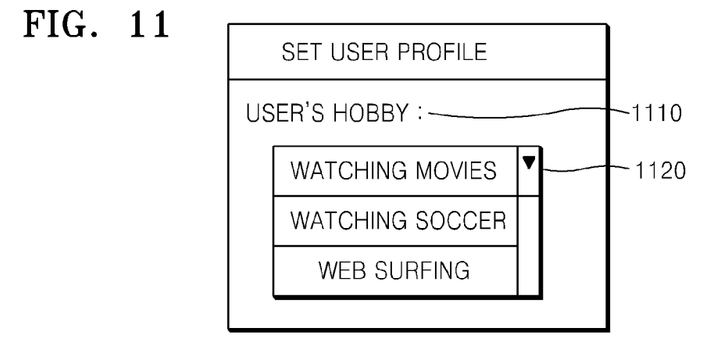
FIG. 11 illustrates a user interface for receiving user profile data, according to an exemplary embodiment.

FIG. 11 illustrates a user interface for receiving user profile data according to an exemplary embodiment.

Referring to FIG. 11, the user interface includes a user hobby input field 1110 and a drop-down menu 1120.

A history of a storage device, accumulated through the use of the storage device, may be stored in the storage device as part of the user profile data, or may be managed as part of the user profile data, based on a user's history. However, the exemplary embodiments are not limited thereto, and a user may directly enter the user profile data via the user interface as shown in FIG. 11. Referring to FIG. 11, the user hobby input field 1110 may allow the user to select his/her favorite hobby. In this case, the user enters watching movies through the user hobby input field 1110 as his/her hobby.

In particular, as shown in FIG. 11, the drop-down menu allows the user to select watching movies in order to enter 'watching movies' as a user's hobby through the user hobby input field 1110.

The exemplary embodiments are not limited thereto, and the user's hobby may be received in many different ways.

Furthermore, the exemplary embodiments are not limited thereto, and various information related to the user, including the user's hobbies, may be received via the user interface. Various information related to the user may be stored in the storage device, as part of the user profile data.

Figure 12:
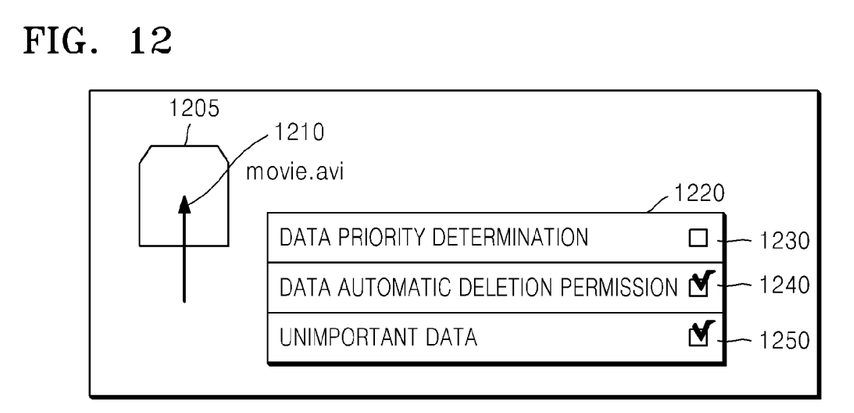
FIG. 12 illustrates a user interface for setting user profile data for each file according to an exemplary embodiment.

FIG. 12 illustrates a user interface for setting user profile data for each file according to an exemplary embodiment.

Referring to FIG. 12, the user interface includes a file 1205, a mouse pointer 1210, and a right-click menu 1220. The right-click menu 1220 includes various options 1230, 1240, and 1250. The right-click menu 1220 may appear when the user places the mouse pointer 1210 over the file 1205 and right clicks on a mouse. However, the exemplary embodiments are not limited thereto, and the right-click menu 1220 may be displayed on the screen by using other methods.

In one exemplary embodiment, the various options 1230, 1240 and 1250 in the right-click menu 1220 are related to the setting of user profile data and include a data priority determination option 1230, a data automatic deletion permission option 1240 and an unimportant data option 1250.

The data priority determination option, which is option 1230, the data automatic deletion permission option, which is option 1240 and the unimportant data option, which is option 1250 may be selected when the user places the mouse pointer 1210 nearby and clicks on an option using the mouse. Alternatively, check boxes respectively next to the options 1230, 1240, and 1250 may be marked to select whether to use the options 1230, 1240, and 1250. Referring to FIG. 12, check boxes next to the data automatic deletion permission option, i.e. option 1240 and the unimportant data option, i.e., option 1250 are clicked in order to use them. The data priority determination option 1230 enables the user to determine a priority level for file 1205. More specifically, the priority level for the file 1205 may be determined through a separate menu after selecting whether to use the data priority determination option 1230. The determined priority level may be stored as part of the user profile data. When the user sets the priority level of the file 1205 to 'high,' the file 1205 will most likely not be selected to reserve a storage space on a storage device. When the user sets the priority level of the file 1205 to 'low,' the file 1205 will most likely be selected and processed to reserve the storage space on the storage device. As the priority level of the file 1205 increases, it is more likely that the file 1205 will not be deleted but rather will be moved or compressed to reserve the storage space on the storage device.

The data automatic deletion permission option 1240 enables the user to select whether to automatically delete data. When the user clicks the data automatic deletion permission option 1240, as shown in FIG. 12, the file 1205 may be deleted to reserve the usable storage space on the storage device. Upon clicking the data automatic deletion permission option 1240 again, the file 1205 may not be deleted to reserve the usable storage space. Furthermore, it is possible to select whether to permit automatic deletion of data by using configurations different from the check boxes.

The unimportant data option 1250 allows the user to select the file 1205 as unimportant data. Upon clicking the unimportant data option 1250, as shown in FIG. 12, the file 1205 may be treated as unimportant data and selected and processed in order to reserve the usable storage space on the storage device. On the other hand, upon clicking the unimportant data option 1250 again, the file 1205 may not be selected or processed to reserve the usable storage space thereon. Even if the file 1205 is selected, the file 1205 may not be deleted. However, the exemplary embodiments are not limited thereto, and the file 1205 may be deleted. Furthermore, the user may select the file 1205 as unimportant data by using configurations different from the check boxes.

Figure 13:
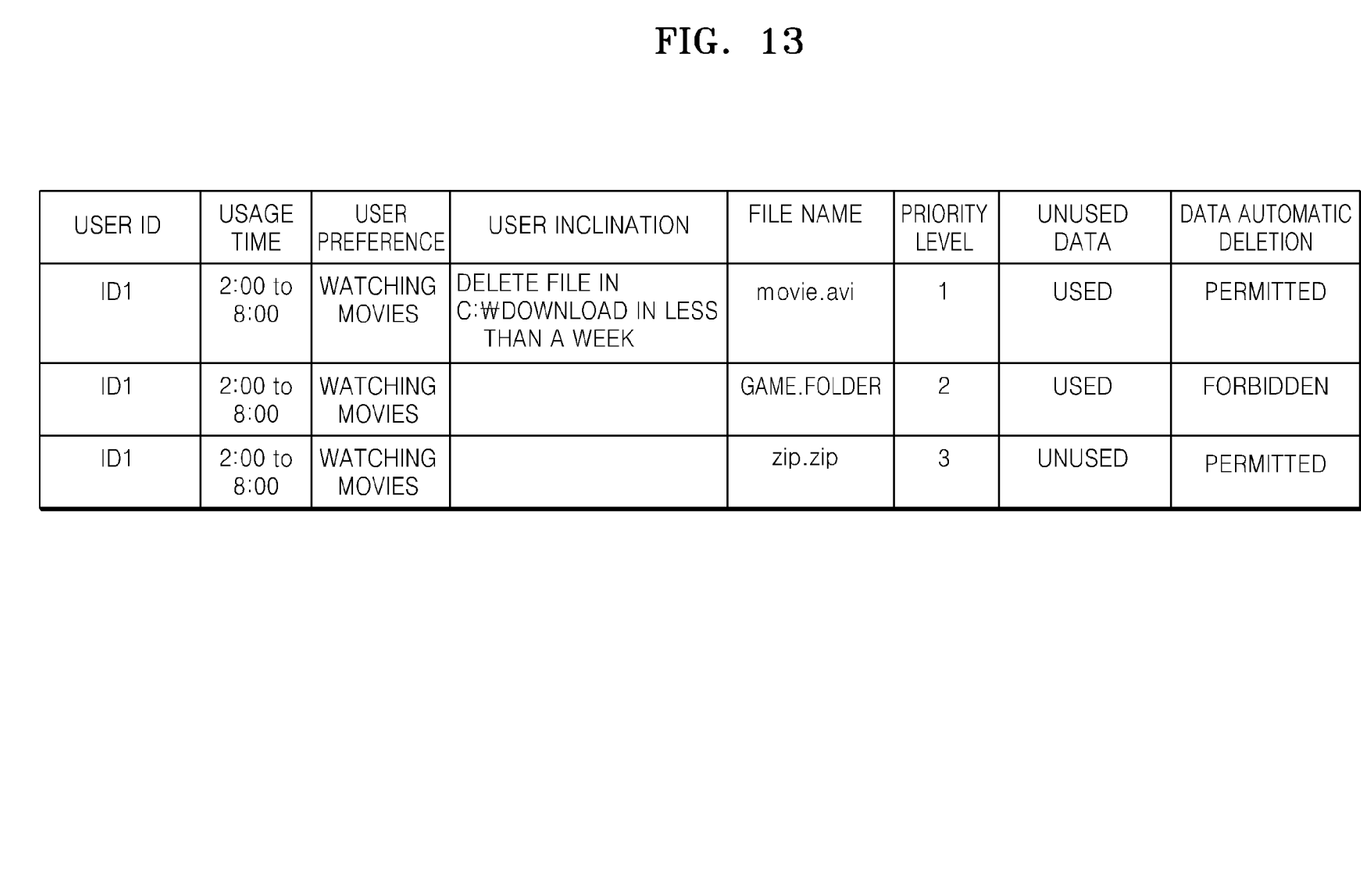
FIG. 13 illustrates user profile data according to an exemplary embodiment.

FIG. 13 illustrates user profile data according to an exemplary embodiment.

Referring to FIG. 13, the user profile data includes information related to an identifier, usage time, a user preference, a user inclination, a file name, a priority level, unused data and automatic data deletion. When many users use an electronic apparatus including a storage device, identifiers are used for identifying the respective users. The identifiers may be IDs with which the respective users use to log on to the electronic apparatus. When an assumption is made that a single user uses an electronic apparatus, such as a mobile apparatus, the user profile data may not include an identifier. A usable storage space on the storage device may be reserved for each user by using the corresponding user identifier.

As shown in FIG. 13, in an exemplary embodiment, the user profile data may include data unrelated to a file, such as the usage time, the user preference and the user inclination. The data unrelated to a file may be used as a reference in selecting a file with a low priority level and processing the selected file in order to reserve the storage space.

The usage time refers to a length of time, including a start time and an end time, during which the storage device or the electronic apparatus, including the same, has been used. The usage time may be input directly through a user interface or stored as part of the user profile data based on a user's history. In an exemplary embodiment, an assumption is made that the user frequently used a computer, including the storage device, from 2:00 pm to 8:00 pm. Thus, 2:00 pm to 8:00 pm may be stored as the usage time, as part of the user profile data, based on the user's history.

The user preferences refer to the user having a an inclination or tendency to do something. The user preferences may be input directly through a user interface or may be stored as part of user profile data, based on a user's history. In an exemplary embodiment, an assumption has been made that the user selected to watch movies through a user interface. Thus, watching movies may be stored as a user preference as part of the user profile data. While FIG. 13 shows that watching movies is a single user preference, the exemplary embodiments are not limited thereto, and the user may have a plurality of preferences.

The user inclination refers to a user's personality or composition. The user inclination is not directly observed but happens unconsciously. The user inclination may be input directly through a user interface or may be stored as part of the user profile data, based on a user's history stored in the storage device. The user inclination may be determined based on the user's history. Referring to FIG. 13, in an exemplary embodiment, an assumption is made that the user always deleted a file less than a week after receipt of the file into a folder C:\DOWNLOAD. The user inclination, as determined based on the user's history, is that the user is inclined to delete the file in the folder C:\DOWNLOAD in less than a week. The user inclination may be stored as part of the user profile data.

According to an exemplary embodiment, user profile data related to a file includes information related to the file name, the priority level, unused data, and automatic data deletion. The user profile data related to a file may be used as a reference in selecting a file having a low priority level and processing the selected file in order to reserve the storage space.

The file name is used to identify a file. The file name is used to determine that data related to a file is data related to a file having a particular file name. The file name may also identify a folder as well as a file.

Priority level information contains information related to a priority level of the file. The priority level may be input directly through a user interface or be stored as part of the user profile data based on a user's history. In an exemplary embodiment, a file movie.avi is set to priority level 1, a game folder is set to priority level 2, and a file name zip.zip is set to priority level 3. The file movie.avi having a high priority level of 1 may not be selected to reserve a storage space on the storage device. Even if the file movie.avi is selected for reserving the storage space on the storage device, the file movie.avi may not be deleted, although it may be moved or compressed. Information related to the unused data may be determined according to selection of the unimportant data option 1250 (FIG. 12). As shown in FIG. 13, information indicating that the unimportant data option 1250 is selected for the file zip.zip so that the file zip.zip is not used, may be stored as part of user profile data.

Information related to the automatic data deletion 1240 may be determined according to selection of the automatic data deletion permission option 1240, as shown in FIG. 12. As shown in FIG. 13, information indicating that the automatic data deletion permission option 1240 is not selected for a game folder. As a result, it is impossible to automatically delete data in the game folder, but the data may be stored as part of the user profile data.

Figure 14:
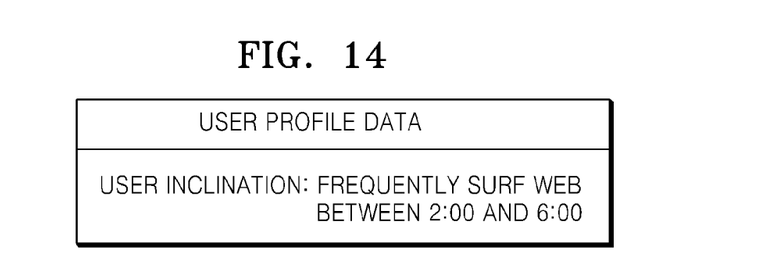
FIG. 14 illustrates a screen displaying user profile data, according to an exemplary embodiment.

FIG. 14 illustrates a screen displaying user profile data, according to an exemplary embodiment. The user may wonder about details related to user profile data that is used as a reference in processing a selected file, in order to reserve a storage space on a storage device. That is, inputting user profile data through a user interface may reflect the intention of a user. On the other hand, user profile data that is stored based on the user's history may reflect the user's history. However, since the user may not directly recognize the user profile data, the user may not desire to process a selected file based on the user profile data. Thus, as shown in FIG. 14, details related to user profile data may be displayed to the user. In this case, all of the user profile data may be displayed, or a portion of the user profile data may be selectively displayed, if necessary. Referring to FIG. 14, the fact that the user frequently surfs the Web between 2:00 and 6:00 is determined based on a user's history, and information indicating the same is displayed to a user.

Figure 15:
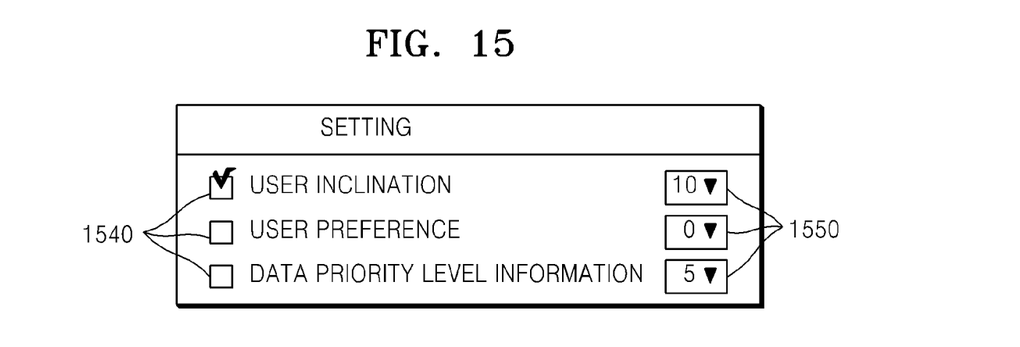
FIG. 15 illustrates setting of data to reserve a usable storage space on a storage device based on user profile data, according to an exemplary embodiment.

FIG. 15 illustrates the setting of data to reserve a usable storage space on a storage device according to user profile data, according to an exemplary embodiment. Checkboxes 1540 and drop-down boxes 1550 are shown in FIG. 15.

Since various types of data, such as user profile data and context data, may be used as a reference to reserve the storage space on the storage device, it is possible to set data that is used as a reference in determining a selection of a file, from among the various types of data when reserving the storage space on the storage device. In an exemplary embodiment, the user may click and mark the check box 1540 on the left side of user inclination so as to set the user inclination as data that is preferentially considered from among the user profile data. However, the exemplary embodiments are not limited thereto, and setting is performed so as to preferentially consider the user inclination according to various configurations. Referring to FIG. 15, according to an exemplary embodiment, the drop-down box 1550 allows a user to set a weight of the user inclination to a maximum of 10, a weight of user preference to 0, a weight of data priority level information to 5, but is not limited thereto. However, the data priority level information with respect to which the check box 1540 not being marked may not be considered although the weight thereof is set to 5. Thus, a file may be selected and processed based on the user inclination and processed to reserve a usable storage space on the storage device. However, the exemplary embodiments are not limited thereto, and other various types of data may be set.

Figure 16:
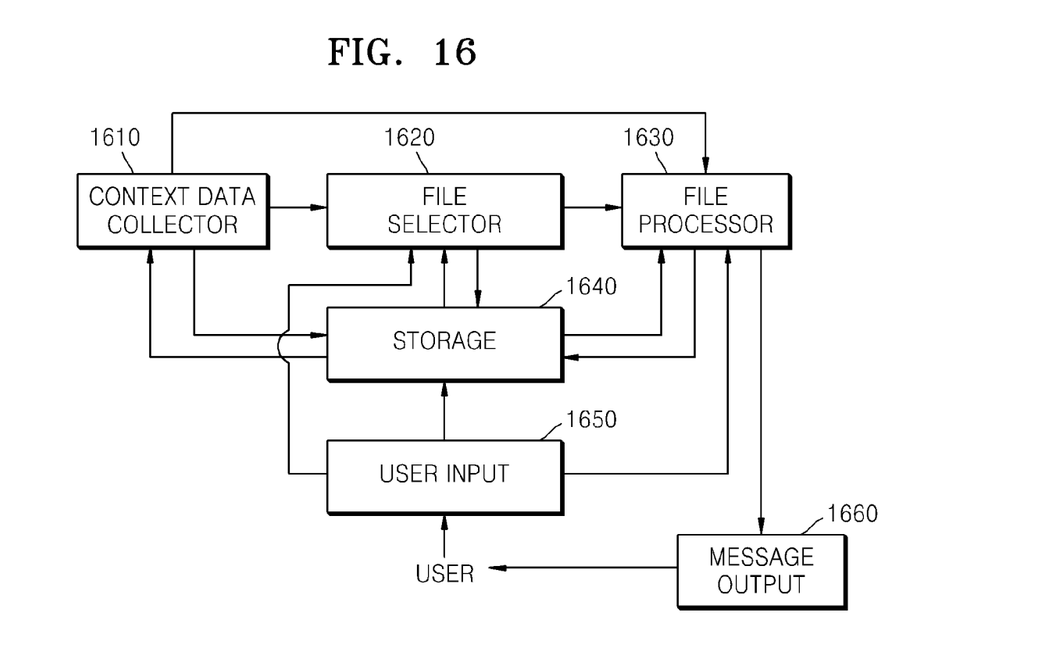
FIG. 16 illustrates an apparatus for managing a storage space on a storage device, according to an exemplary embodiment.

FIG. 16 illustrates an apparatus for managing a storage space on a storage device, according to an exemplary embodiment. Referring to FIG. 16, the apparatus includes a context data collector 1610, a file selector 1620, a file processor 1630, a storage 1640, a user input 1650, and a message output 1660. The context data collector 1610 collects context data according to various methods. For example, the context data may be collected from sensors, such as a gyroscope, a light detection sensor and a GPS sensor. Location information may be collected by using a GPS sensor or a compass module, and network information may be collected through communication modules, such as Wi-Fi and Bluetooth®.

The file selector 1620 selects a file having a low priority level by using at least one of the context data collected by the context data collector 1610 and user profile data that is received through the user input 1620 or stored in the storage 1640. The collected context data is then stored in the storage 1640 and used for selecting a file.

To reserve a usable storage space on a storage device, the file processor 1630 processes the file selected by the file selector 1620 by using at least one of the context data and the user profile data. The collected context data may be stored in the storage 1640 so that an electronic apparatus including the storage device may use the context data to process the selected file.

The usable storage space may be reserved on the storage device by performing at least one of deletion, movement and compression of the selected file. In particular, in response to a determination that the storage device is able to connect to a wireless network while the user moves, the file processor 1630 may move the selected file to another storage device over the wireless network. On the other hand, in response to a determination that the storage device is not able to connect to the wireless network while the user moves, the file processor 1630 may move the selected file to another storage device in the electronic apparatus including the storage device.

The user input 1650 may receive user profile data from the user.

The storage 1640 may store the context data collected by the context data collector 1610. The user profile data may be received through the user input 1650 and stored in the storage 1640, or a user's history may be stored as part of the user profile data. The user's history may be stored as part of the user profile data based on history records selected by the file selector 1620 or processed by the file processor 1630. The storage 1640 may be the same as the storage device attempting to reserve a usable storage space. However, the exemplary embodiments are not limited thereto, and the storage 1640 may be different from the storage device.

The message output 1660 may output to a user a message which indicates that the file processor 1630 processes the selected file to reserve a usable storage space on the storage device. The message output 1660 may also output to the user a message which indicates the performance of at least one of the tasks performed by the file processor 1630. When the file processor 1630 attempts to delete the file selected by the file selector 1620, the message output 1660 may also output a message to the user, asking the user to confirm whether to delete the file.

While one or more exemplary embodiments have been described with reference to the figures, it will be understood by those of ordinary skill in the art that various changes in form and details may be made therein without departing from the spirit and scope of the present invention as defined by the following claims. Thus, it should be understood that the exemplary embodiments described therein should be considered in a descriptive sense only and not for purposes of limitation.

What is claimed is:

1. A method in an electronic device, comprising:
   obtaining, by at least one processor, network information including a network connection status and storage information which includes storage space information of a storage of the electronic device, and user profile information including a user option of whether to move at least a portion of a plurality of files stored in the storage;
   determining, by the at least one processor, to perform movement of at least one file based on the user profile information including the user option of whether to move the at least a portion of the plurality of files and the network information and the storage information; and
   performing, by the at least one processor, movement of the at least one file to a cloud server in response to determining to perform movement of the at least one file,
   wherein the storage space information is related to remaining storage space in the storage, and
   the network information including the network connection status indicates whether the electronic device is connected to a predetermined network.

2. The method of claim 1, wherein the predetermined network is a Wi-Fi network.

3. The method of claim 1, wherein the performing movement comprises performing transmission by the electronic device, the at least one file to the cloud server in the predetermined network based on a determination that the electronic device is connected to the predetermined network according to the network information including the network connection status.

4. The method of claim 1, wherein the user profile information further includes information about the number of times that a user accesses the at least one file among the plurality of files, and
   wherein the determining to perform movement of the at least one file comprises:
   determining the at least one file among the plurality of files based on information about the number of times that a user accesses the at least one file among the plurality of files; and
   determining to perform the movement of the at least one file based on the user profile information including the user option of whether to move the at least a portion of the plurality of files.

5. The method of claim 1, wherein the user option of whether to move the at least a portion of the plurality of files is selected by a user.

6. The method of claim 1, wherein the method further comprises receiving user input in response to determining to perform movement of the at least one file, and the performing of movement of the at least one file to the cloud server comprises performing, by the at least one processor, movement of the at least one file to a cloud server in response to the determining to perform movement of the at least one file and the receiving the user input.

7. The method of claim 1, wherein the performing of movement of the at least one file to the cloud server further comprises determining a cloud server which includes a storage for the at least one file from a plurality of storages based on the network information including the network connection status.

8. A non-transitory computer readable recording medium having recorded thereon a program for executing the method of claim 1.

9. An electronic device comprising:
   at least one processor configured to:
   obtain network information including a network connection status and storage information which includes storage space information of a storage of the electronic device, and user profile information including a user option of whether to move at least a portion of a plurality of files stored in the storage,
   determine to perform movement of at least one file based on the user profile information including the user option of whether to move the at least a portion of the plurality of files and the network information and the storage information, and
   perform movement of the at least one file to a cloud server in response to determining to perform movement of the at least one file,
   wherein the storage space information is related to remaining storage space in the storage, and the network information including the network connection status indicates whether the electronic device is connected to a predetermined network.

10. The electronic device of claim 9, wherein the predetermined network is a Wi-Fi network.

11. The electronic device of claim 9, wherein when the processor performs movement of the at least one file, the processor is configured to perform transmission of the at least one file to the cloud server in the predetermined network based on a determination that the electronic device is connected to the predetermined network according to the network information including the network connection status.

12. The electronic device of claim 9, wherein the user profile information further includes information about the number of times that a user accesses the at least one file among the plurality of files, and when the at least one processor determines to perform movement of the at least one file, the at least one processor determines the at least one file among the plurality of files based on information about the number of times that a user accesses the at least one file among the plurality of files, and determines to perform the movement of the at least one file based on the user profile information including the user option of whether to move the at least a portion of the plurality of files.

13. A method in an electronic device, comprising:

obtaining, by at least one processor, network information including a network connection status and storage information which includes storage space information of a storage of the electronic device, and user profile information including a user option of whether to move at least a portion of a plurality of files stored in the storage;

determining, by the at least one processor, to perform movement of at least one file based on the user profile information including the user option of whether to move the at least a portion of the plurality of files and the network information and the storage information; and performing, by the at least one processor, movement of the at least one file to a cloud server in response to determining to perform movement of the at least one file, wherein the movement of the at least one file comprises transmission of the at least file to the cloud server and deletion of the at least one file in the storage of the electronic device, wherein the storage space information is related to remaining storage space in the storage, and the network information including the network connection status indicates whether the electronic device is connected to a predetermined network.

* * * * *